(12) United States Patent
Felber et al.

(10) Patent No.: US 8,157,883 B2
(45) Date of Patent: Apr. 17, 2012

(54) COMPRESSIBLE FILTER ELEMENT HAVING END CAPS INCLINED TO ONE ANOTHER

(75) Inventors: Uwe Felber, Abtseinach (DE); Ulrich Stahl, Laudenbach (DE); Claudio Marin, Heidelberg (DE); Christian Arns, Wenden (DE)

(73) Assignee: Carl Freudenberg KG, Weinheim (DE)

( * ) Notice: Subject to any disclaimer, the term of this patent is extended or adjusted under 35 U.S.C. 154(b) by 292 days.

(21) Appl. No.: 12/480,872

(22) Filed: Jun. 9, 2009

(65) Prior Publication Data

US 2009/0313960 A1 Dec. 24, 2009

(30) Foreign Application Priority Data

Jun. 19, 2008 (DE) .......................... 10 2008 028 834

(51) Int. Cl.
*B01D 46/00* (2006.01)

(52) U.S. Cl. ............. 55/510; 55/385.3; 55/498; 55/529; 55/DIG. 28; 123/198 E; 210/493.2; 210/497.01

(58) Field of Classification Search ............... 55/385.3, 55/490, 498, 510, 529, DIG. 28; 123/198 E; 210/493.2, 497.01
See application file for complete search history.

(56) References Cited

U.S. PATENT DOCUMENTS

| | | | | | |
|---|---|---|---|---|---|
| 3,399,516 | A | * | 9/1968 | Hough, Jr. | 55/487 |
| 3,849,093 | A | * | 11/1974 | Konishi et al. | 96/138 |
| 3,877,910 | A | * | 4/1975 | Konishi et al. | 55/502 |
| 4,071,004 | A | * | 1/1978 | Ostergaard | 123/539 |
| 4,162,660 | A | * | 7/1979 | Albertson et al. | 116/268 |
| 4,300,928 | A | * | 11/1981 | Sugie et al. | 55/385.1 |
| 5,447,546 | A | * | 9/1995 | Thibodeau | 55/510 |
| 5,549,724 | A | | 8/1996 | Mochida | |
| 2008/0110145 | A1 | | 5/2008 | Beer et al. | |
| 2008/0138256 | A1 | * | 6/2008 | Salasc et al. | 422/168 |

FOREIGN PATENT DOCUMENTS

| | | |
|---|---|---|
| AU | 1385170 | 4/1970 |
| DE | 1 636 124 | 8/1972 |
| DE | 10063778 | 9/2002 |
| DE | 102004054274 | 5/2006 |
| DE | 202005003046 U1 | 7/2006 |
| DE | 102005051676 | 5/2007 |
| EP | 1867378 | 12/2007 |
| FR | 798869 | 5/1936 |

(Continued)

OTHER PUBLICATIONS

Machine translation of German Publication No. DE 102005051676, published May 3, 2007.*

(Continued)

*Primary Examiner* — Robert Clemente
(74) *Attorney, Agent, or Firm* — Grossman, Tucker, Perreault & Pfleger, PLLC (57) ABSTRACT

A filter element, comprising a first component, a second component, and a filter medium, which is situated between the components, the components being spaced apart by the filter medium, the components and the filter medium delimiting a permeable volume, and the filter medium implementing a wall surface, through which a fluid may pass for filtering, is characterized in regard to the object of designing and refining a filter element in such a way that it may be used in tight installation spaces in that the components are oriented inclined to one another or have surfaces inclined to one another.

18 Claims, 3 Drawing Sheets

FOREIGN PATENT DOCUMENTS

| | | |
|---|---|---|
| FR | 2063849 | 7/1971 |
| GB | 1 034 174 | 6/1966 |
| WO | 2005115581 | 12/2005 |
| WO | 2009/019244 | 2/2009 |

OTHER PUBLICATIONS

Notice of Opposition from corresponding EPO Application No. 2 135 662 dated Mar. 28, 2011.

* cited by examiner

Fig. 4

COMPRESSIBLE FILTER ELEMENT HAVING END CAPS INCLINED TO ONE ANOTHER

TECHNICAL AREA

The invention relates to a filter element, comprising a first component, a second component, and a filter medium situated between the components, the components being spaced apart by the filter medium, the components and the filter medium delimiting a permeable volume, and the filter medium implementing a wall surface, through which a fluid may pass for filtering.

PRIOR ART

Filter elements of the type cited at the beginning are already known from the prior art and are used in particular in engine supply air filtration in motor vehicles, namely in their intake systems.

The known filter elements are designed as filter cartridges, in particular as round filters. A filter medium is situated sandwiched between two end caps oriented parallel to one another. An axially situated flow channel is implemented in the end caps, which may be connected to an intake system.

In the known filter elements, the fluid flow which passes through the wall surface, specifically is suctioned through to the motor, is guided through the flow channel in the end caps.

This constructive design requires fluid guiding which occupies installation space. However, installation spaces are dimensioned extremely tightly in modern motor vehicles.

DESCRIPTION OF THE INVENTION

The invention is therefore based on the object of designing and refining a filter element of the type cited at the beginning in such a way that it may be used in tight installation spaces.

The above-mentioned object is achieved according to the invention by the features of Claim 1. The filter element cited at the beginning is accordingly characterized in that the components are situated inclined to one another or have faces inclined to one another.

It has been recognized according to the invention that two components which are situated inclined to one another or have faces which are inclined to one another allow a configuration of the filter element in tight installation spaces. The components are implemented according to the invention as end caps which cover the filter medium on both sides and accommodate it. The inclined configuration of the components results in beveling of the filter element, so that it may also be situated in tight inclined installation spaces.

The object cited at the beginning is thus achieved.

The components may delimit two planes of the filter medium which are inclined to one another. It is advantageous for this purpose that a beveled, essentially cylindrical filter medium having inclined bases can be glued into the components or encapsulated thereby. With a folded filter medium, the fold front sides may lie in the inclined planes and the fold backs may extend substantially orthogonally to a component.

In particular, it is conceivable that the components are inclined or have inclined surfaces in such a way that the filter element displays a wedge shape. Through this concrete design, the filter element may be inserted in a space-saving manner into inclined installation spaces. Furthermore, the wedge shape allows the implementation of a high wall surface and a low wall surface, the high wall surface being opposite to the flow channel and thus being able to have fluid to be filtered applied to it effectively.

A wedge-shaped filter element having a laterally situated flow channel may be installed especially well in tight installation spaces, because the height of the filter element is reduced in the area of the implementation of the flow channel. Furthermore, a wedge-shaped filter element has two planes inclined to one another and can thus be compressed upon application of force to the planes.

Against this background, the filter element may have at least one laterally situated flow channel to the permeable volume. A laterally situated flow channel, whose axis is oriented essentially orthogonally to the wall surface of the filter medium, allows a use of the filter medium in tight installation spaces. A laterally situated flow channel allows a fluid which is sucked into the permeable volume to be caused to flow out in the plane of the filter medium. Through this design, it is possible to use the filter element as an engine supply air filter in modern motor vehicles, even in very tight installation spaces.

The flow channel may be opposite to an area of the wall surface which faces away from it. Through this concrete design, a fluid may be effectively suctioned through the filter medium and filtered thereby. The suction guided by the flow channel is oriented directly onto the wall surface.

The flow channel may be shaped out of a component and implemented integrally therewith. Through this concrete design, the filter element can be manufactured from three components, namely the first and second components and the filter medium. Before this background, it is conceivable that recesses are implemented in the filter medium itself, which a flow channel may penetrate.

The flow channel may be oriented parallel to the surface of a component. A very favorable flow guiding of the entering fluid is ensured by this concrete design, because the fluid may have a laminar flow along the surface of the component.

The known filter cartridges are currently frequently situated in crumple zones and thus crash-relevant areas of a motor vehicle. It is problematic in this case that the known filter cartridges, because of their compact construction and rigid shape, offer very great resistance to deformations and restrict the deformability of the overall intake system. This is critical in particular if a road user, such as a pedestrian, hits an area of the vehicle body, under which such a hard component is situated, with a body part.

In the most unfavorable case, a filter element made of paper is situated below the vehicle body, such as the engine hood, in an intake system. The deformability of the intake system and thus of the vehicle body is so greatly restricted by the filter element that there is a significant risk of injury to the road user.

For this reason, the known filter elements must be situated spaced apart from vehicle body components in such a way that problem-free deformability of the vehicle body and/or the intake system is ensured. The consequence thereof is unused installation spaces, in particular under the engine hood.

Before this background, the filter media may be manufactured from a nonwoven material and folded in such a way that a distance between the components is at least regionally reversibly reducible upon application of force thereto. Through the use of a nonwoven material, a reversibly deformable filter element is produced which offers a sufficiently large filter area. The filter performance of a paper may also be ensured by a nonwoven material which has a specific folding at lower fold density. The fold backs of two adjacent folds may be spaced further apart than those of a filter medium made of paper. The fold density may thus be decreased. The spacing of the folds further apart allows buckling of the folds and thus problem-free reduction of the distance between the components. Furthermore, a nonwoven material has a special elasticity, which allows a reversible deformation of the filter element. This ensures a limited usage capability of the filter element after deformation by an accident, namely a so-called emergency operating property.

The distance between the components may be reducible by at least 20%, preferably by at least 75%. This concrete design ensures that a pedestrian who has a body part strike against the vehicle body of a motor vehicle is largely protected from injuries. The risk of injury is thus significantly decreased.

Before this background, it is conceivable that the filter medium has heights h which are reducible by at least 20%, preferably by at least 75%. In this concrete design, the components may be manufactured from a hard material and have to contribute nearly nothing to the compressibility of the overall filter element. An especially cost-effective manufacturing process may thus be implemented, because the components may be manufactured from typical plastics. In particular however, it is also conceivable that the components are manufactured from a compacted nonwoven material. A construction of the filter element from a uniform material may thus be implemented.

The compressibility of the filter element, i.e., its force-distance behavior, may be set by modification of the nonwoven material employed. This modification may be implemented by using fibers of differing bending rigidity. Synthetic fibers may be bonded to natural fibers in a specific mixing ratio to one another. The rigidity of the nonwoven material may also be set by different manufacturing methods. For example, the rigidity of the nonwoven material may be set by suitable selection of the parameters of water jet needling.

The filter medium may have various heights h at various points. Through this concrete design it is possible to position a filter element between two components, a flow channel being implemented in one component. The flow channel may be situated where the filter medium has a low height.

The nonwoven material may comprise synthetic fibers or may consist entirely of synthetic fibers. For this purpose, it is conceivable that the synthetic fibers are manufactured from polypropylene, polyester, or polybutadiene terephthalate. A motor vehicle producer requires a very concrete filter performance from a usable filter element in intake systems according to DIN ISO 5011, namely a separation performance of greater than 98%. According to this norm, a filter element only displays sufficient filter performance if 98% of the test dust in the air to be filtered is separated in the filter medium. Surprisingly, it has been shown that a nonwoven material which comprises synthetic fibers meets these requirements with problem-free deformability. The problem-free deformability is substantially implemented by a relatively wide fold distance.

The filter medium may be manufactured from a thermoplastic nonwoven material. A thermoplastic nonwoven material surprisingly displays a high compressibility in the folded state. Experiments have shown that a folded nonwoven material of a height of 48 mm, which has force applied to it in the direction of the fold backs, is compressible by 28.32 mm at 100 N. The studied nonwoven material is reducible in its height by 0, 0.4 mm, 2.76 mm, 9.54 mm, and 17.23 mm at 0, 5 N, 10 N, 20 N, and 50 N, respectively. The force vector is oriented parallel to the fold backs in this measurement.

The force application occurs on a nonwoven material area of 40 mm width and 100 mm length. The thermoplastic nonwoven material used is a nonwoven material which is manufactured from polyester fibers. The nonwoven material has no binders, rather, the fibers are welded to one another by thermal compaction methods. The nonwoven material has a weight per unit area of 230 g/m$^2$.

It is also conceivable to use nonwoven materials which have a weight per unit area of 100 to 500 g/m$^2$. Nonwoven materials of these weights per unit area have a sufficiently high intrinsic rigidity in order to space two components apart from one another and additionally provide sufficiently high filter performance.

Furthermore, the use of a nonwoven material surprisingly allows the components to be spaced apart solely by the filter medium, because the nonwoven material displays a sufficiently high intrinsic rigidity as a result of its fiber structure. In contrast to paper, a nonwoven material also has a very high tear resistance and thus high stability after being wet through and subsequently drying. Finally, a nonwoven material made of synthetic material displays high temperature stability and is therefore suitable for use in engine compartments of motor vehicles. Further stabilization means which support the filter medium as it spaces the components apart are not absolutely necessary. Cost-effective manufacturing of the filter element may thus be implemented. However, further stabilization means may be provided in order to set the deformability of the filter element in a defined way.

The filter medium may have folds whose fold front sides face toward the components. This concrete design allows connection of the filter medium to the components without problems. For example, before this background it is conceivable that an adhesive is associated with the components, in which the fold front sides are immersed and thus form a bond with the components.

The fold backs of two adjacent folds may have a distance of 0.5 to 3 cm. The selection of the distance from this range has proven to be especially advantageous in order to provide deformability of the filter medium without problems, on the one hand, and still provide a sufficiently large effective filter area, on the other hand, which is necessary for the engine supply air filtration. Filter media made of paper could not implement a sufficient filter performance, i.e., the separation rate required by the automobile industry, at such a fold back distance, and are therefore unsuitable for intake systems.

Very concretely, it is also conceivable that the folds are provided with intended bending points, which cause defined buckling of the filter medium upon application of force. In particular, it is conceivable that contours are embossed on the folds, which predetermine or initiate a specific buckling behavior of the folds upon application of force to the components. The intended bending points may be embossed on the filter medium by ultrasonic welding processes. Ultrasonic welding processes may be performed particularly rapidly and cost-effectively and allow problem-free regional tapering of a filter medium. It is also conceivable to implement embossing of the filter medium solely by application of force.

In order to cause problem-free deformability of the filter element, the fold backs may enclose an angle different from 90° with the bases of the components. The fold backs thus inclined may then be deformed without problems and especially easily in such a way that the components approach one another.

It is also conceivable that two or more folds are connected at defined distances to one another in such a way that the fold walls or fold flanks press against one another. Areas of two or more connected folds may be spaced apart by a defined number of unconnected folds. Thus, very concretely, but not restricted thereto, two folds may be connected to one another every five folds, for example. In this way, the deformability of the filter element may be set. The fold walls may be glued or welded to one another, or connected to one another in a formfitting way. Gluing produces a very solid bond. Welding may be implemented with stiffening of the folds. The formfitting connection permits detachment of the folds from one another under specific circumstances.

At least one component may be manufactured from a material which is harder or more rigid than the filter material. This concrete design allows manufacturing of a stable filter element which protects the filter medium against impact and shock effects. Furthermore, the filter medium is protected from contamination. Before this background, it is conceivable that at least one component is manufactured from a compacted nonwoven material.

In order to implement cost-effective manufacturing, at least one component may be manufactured using injection-molding technology. It is conceivable in this case that the components are manufactured from polypropylene or polyamide.

At least one component may be manufactured in foamed form. Such a component forms a very good composite with the filter medium, because the foamed material may flow around the folds of the filter material. Polyurethane may be used as the foamed material. This material may be processed without problems.

Manufacturing the components from metal is also conceivable. Metals give the filter element high stability and temperature resistance.

Intended breaking means may be associated with at least one component, which space the components apart from one another as a supplement to the filter medium. The use of a relatively hard filter medium is thus possible. The intended breaking means may be designed in such a way that they break at a very concrete application of force to the components and ensure deformability of the filter element.

It is also conceivable that elastically deformable stabilization elements are situated between the components. Deflection and rebound of the components are thus possible. Very concretely, the stabilization elements may be implemented as spiral springs or leaf springs, because they are very mechanically stable and are settable without problems in regard to their spring constants.

The filter element may be designed as an air filter of a motor vehicle. The problem-free deformability of the filter element according to the invention makes it outstandingly suitable to be situated in a motor vehicle directly below the engine hood, where air filters are typically situated. Before this background, it is conceivable that a component functions as a cover of the volume in the air filter housing, into which the filter element is inserted. Seals may be associated with the component at the factory to seal the volume in the air filter housing. A more rapid installation process may be implemented in this way.

There are various possibilities for advantageously designing and refining the teaching of the present invention. For this purpose, reference is made, on the one hand, to the subordinate claims, and, on the other hand, to the following explanations of preferred exemplary embodiments of the filter element according to the invention on the basis of the drawing.

Generally preferred designs and refinements of the teaching are also explained in connection with the explanation of the preferred exemplary embodiments on the basis of the drawing.

EMBODIMENT OF THE INVENTION

Figure 1:
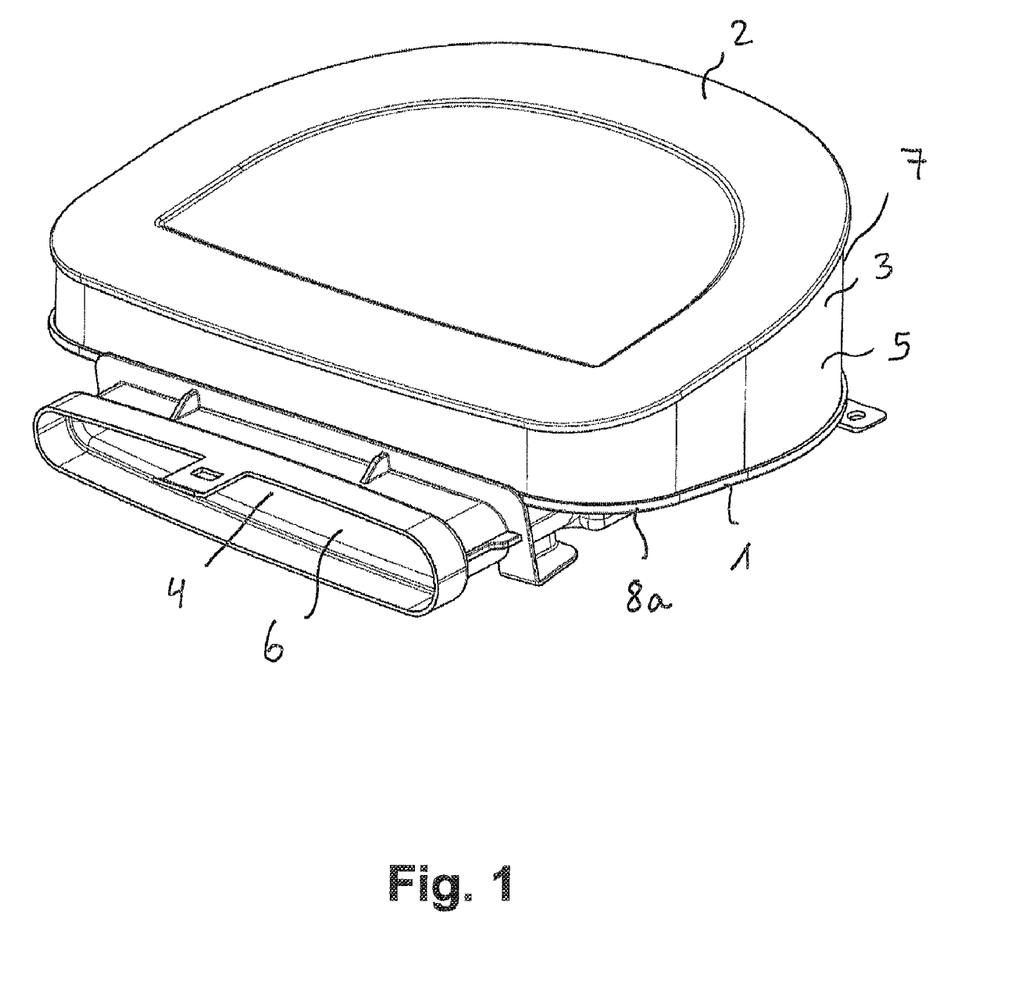
FIG. 1 shows a perspective view of a filter element which comprises two components and a filter medium.

FIG. 1 shows a filter element comprising a first component 1, a second component 2, and a filter medium 3, which is situated between the components 1, 2, the components 1, 2 being spaced apart by the filter medium 3. The components 1, 2 and the filter medium 3 delimit a permeable volume 4, the filter medium 3 implementing a peripheral wall surface 5, through which a fluid may pass for filtering. The filter element has a laterally situated flow channel 6 to the permeable volume 4. The flow channel 6 is oriented laterally, namely on the side and thus essentially orthogonally to the wall surface 5 of the filter medium 3. An area 7 of the wall surface 5 facing away therefrom is opposite to the flow channel 6. The components 1, 2 accommodate the filter medium 3.

The flow channel 1 is shaped out of a component 1 and implemented as integral therewith. The flow channel 6 is oriented parallel to the surface 8 of a component. The components 1, 2 are oriented inclined to one another.

Figure 2:
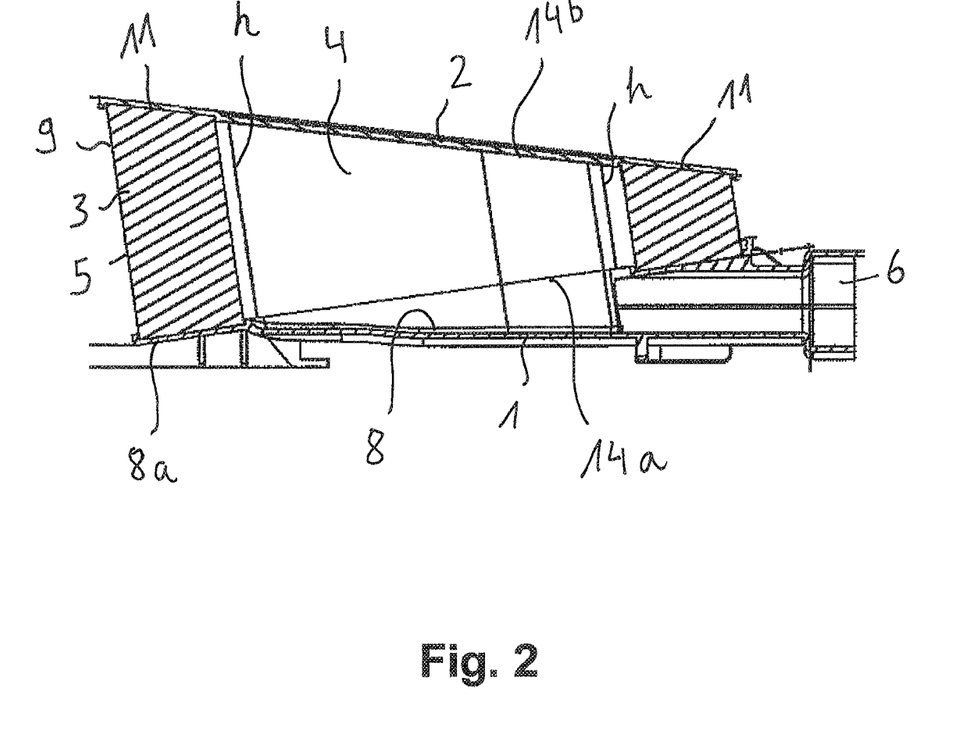
FIG. 2 shows a sectional view of the filter element from FIG. 1.

FIG. 2 shows a sectional view of the filter element from FIG. 1. The filter element comprises a first component 1, a second component 2, and a filter medium 3, which is situated between the components 1, 2, the components 1, 2 being spaced apart by the filter medium 3. The components 1, 2 and the filter medium 3 delimit a permeable volume 4, the filter medium implementing a wall surface 5, through which a fluid may pass for filtering. The filter element has a laterally situated flow channel 6 to the permeable volume 4. An area 7 of the wall surface 5 facing away therefrom is opposite to the flow channel 6. The flow channel 6 is shaped out of the component 1 and implemented as integral therewith. The flow channel 6 is oriented parallel to the surface 8 of the component 1. The components 1, 2 are oriented parallel to one another and provide the filter element with a wedge shape.

The filter medium of the filter elements described in FIGS. 1 through 4 is manufactured from a nonwoven material and folded in such a way that a distance between the components 1, 2 is at least regionally reversibly reducible upon application of force thereto. The distance is reducible by at least 20%, preferably by at least 75%.

The filter medium 3 has heights h, which are reducible by at least 20%, preferably by at least 75%. It can be inferred from FIG. 2 that the filter medium 3 has various heights h at various points. The filter medium 3 has a lower height in the area of the flow channel 6 than on the side facing away from the flow channel 6.

The filter medium 3 is manufactured from a nonwoven material, which comprises synthetic fibers or various fibers of different bending rigidity. The filter medium 3 is manufactured from a thermoplastic nonwoven material.

Figure 3:
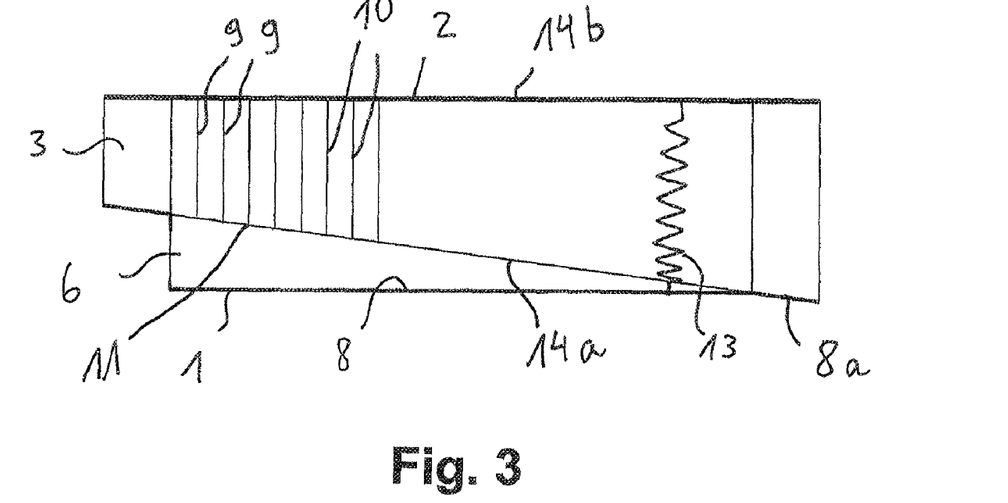
FIG. 3 shows a sectional view of the filter element from FIG. 1 in a schematic view, in which the fold backs are partially shown.

FIG. 3 partially shows the folds 10 of the filter medium 3 in a schematic sectional view of the filter element according to FIG. 1. The fold backs 9 of two adjacent folds 10 have a distance of 0.5 to 3 cm. It is schematically shown in FIG. 3 that elastic stabilization elements 13 are associated with at least one component 1, 2. The stabilization element 13 in FIG. 3 is designed as a spring, which counteracts a compression of the components 1, 2.

Figure 4:
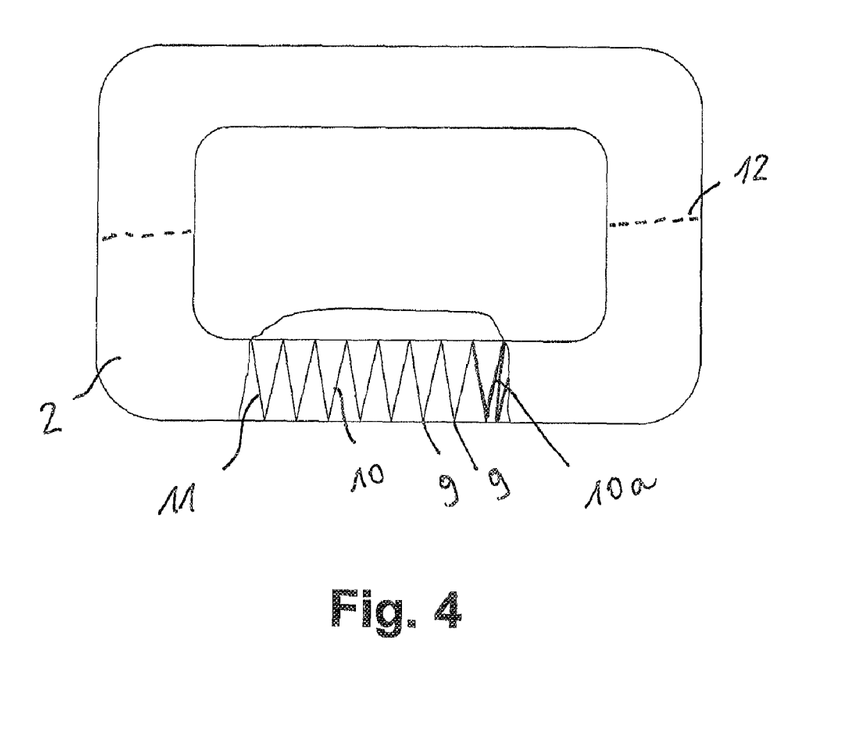
FIG. 4 shows a schematic top view of a rectangular filter element, in which the fold front sides are recognizable, which face toward the components.

FIG. 4 shows the fold front sides 11, which face toward a component 2, shown cut away, and are glued thereto or encapsulated thereby, in a schematic top view of a rectangularly implemented filter element. Two or more folds 10 are connected at defined distances to one another in such a way that the fold walls or fold flanks 10*a* at least partially press against one another. Intended break means 12 may be associated with at least one component 1, 2, which are shown in FIG. 4 by a dashed line. The intended break means 12 may be implemented by a material weakening in the component 2.

At least one component 1, 2 of the filter elements described in FIGS. 1 through 4 may be manufactured from a material which is harder than the filter medium 3. At least one component 1, 2 may be manufactured in injection-molding technology.

The components 1, 2 in FIGS. 1 through 4 delimit two planes 14*a* and 14*b* of the filter medium 3, which are inclined to one another. A beveled, essentially cylindrical filter medium 3 having inclined bases, namely the planes 14*a* and 14*b*, is glued into the components 1, 2 or encapsulated thereby. The fold front sides 11 are in the inclined planes 14*a* and 14*b* and the fold backs 9 extend essentially orthogonally or nearly orthogonally to a face of the component 1. The fold backs 9 enclose an acute angle with a face of the component 1.

The component 2 in FIG. 2 is implemented as essentially flat, the component 1 in FIG. 2 has a flat surface 8, onto which an inclined collar 8*a* is formed. The flat surface 8 extends essentially over the width of the flow channel 6. The collar 8*a* is situated in order to accommodate the beveled filter medium 3. The fold backs 9 form a right angle with the collar 8*a* in FIG. 2 and enclose an acute angle with the surface 8. The fold backs 9 also enclose an acute angle with the component 2.

Reference is made, on the one hand, to the general part of the description and, on the other hand, to the appended claims in regard to further advantageous designs and refinements of the teaching according to the invention.

Finally, it is very particularly emphasized that the previous purely arbitrarily selected exemplary embodiments are used only to explain the teaching according to the invention, but do not restrict this teaching to these exemplary embodiments.

What is claimed is:

1. A filter element, comprising
a first component,
a second component,
a filter medium, which is situated between the components,
the components being spaced apart by the filter medium,
the components and the filter medium delimiting a permeable volume, and the filter medium implementing a wall surface, through which a fluid may pass for filtering, and
at least one laterally situated flow channel to the permeable volume,
wherein the components are oriented inclined to one another or have surfaces inclined to one another and said components delimit two planes of the filter medium which are inclined to one another wherein the height of the filter medium is reduced in the area of the implementation of the flow channel.

2. The filter element according to claim 1, wherein an area of the wall surface facing away therefrom is opposite to the flow channel.

3. The filter element according to claim 1, wherein the flow channel is shaped out of a component and is implemented as integral therewith.

4. The filter element according to claim 1, wherein the flow channel is oriented parallel to the surface of a component.

5. The filter element according to claim 1, wherein the filter medium is manufactured from a nonwoven material and is folded in such a way that a distance between the components is at least regionally reversibly reducible upon application of force thereto.

6. The filter element according to claim 5, wherein the distance is reducible by at least 20%.

7. The filter element according to claim 5, wherein the filter medium has folds whose fold front sides face toward the components.

8. The filter element according to claim 5, wherein the fold backs of two adjacent folds have a distance of 0.5 to 3 cm.

9. The filter element according to claim 5, wherein the folds are provided with intended bending points.

10. The filter element according to claim 5, wherein two or more folds are connected to one another at defined distances in such a way that the fold walls or fold flanks at least partially press against one another.

11. The filter element according to claim 5, wherein the filter medium has heights h which are reducible by at least 20%.

12. The filter element according to claim 1, wherein the filter medium has various heights h at various points.

13. The filter element according to claim 1, wherein the filter medium is manufactured from a nonwoven material, which comprises synthetic fibers or various fibers of differing bending rigidity.

14. The filter element according to claim 1, wherein the filter medium is manufactured from a thermoplastic nonwoven material.

15. The filter element according to claim 1, wherein at least one component is manufactured from a material which is harder than the filter medium.

16. The filter element according to claim 1, wherein at least one component is manufactured in injection-molding technology.

17. The filter element according to claim 1, wherein intended break means are associated with at least one component.

18. The filter element according to claim 1, wherein elastic stabilization elements are associated with at least one component.

* * * * *

UNITED STATES PATENT AND TRADEMARK OFFICE
CERTIFICATE OF CORRECTION

PATENT NO. : 8,157,883 B2  Page 1 of 1
APPLICATION NO. : 12/480872
DATED : April 17, 2012
INVENTOR(S) : Uwe Felber et al.

It is certified that error appears in the above-identified patent and that said Letters Patent is hereby corrected as shown below:

On the Face Page, in field (75), in Inventors, in column 1, line 1 delete "Abtseinach" and insert -- Abtsteinach --, therefor.

Signed and Sealed this
Thirty-first Day of July, 2012

David J. Kappos
*Director of the United States Patent and Trademark Office*

UNITED STATES PATENT AND TRADEMARK OFFICE
CERTIFICATE OF CORRECTION

PATENT NO. : 8,157,883 B2
APPLICATION NO. : 12/480872
DATED : April 17, 2012
INVENTOR(S) : Uwe Felber et al.

It is certified that error appears in the above-identified patent and that said Letters Patent is hereby corrected as shown below:

On the Face Page, in field (73), in Assignee, in column 1, line 2 insert second Assignee --Montaplast GMBH, Morsbach (DE)--.

Signed and Sealed this
Thirteenth Day of November, 2012

David J. Kappos
*Director of the United States Patent and Trademark Office*